Feb. 12, 1935.  R. P. FITZGERALD  1,990,478
DROP HAMMER
Filed Feb. 26, 1931   8 Sheets-Sheet 8

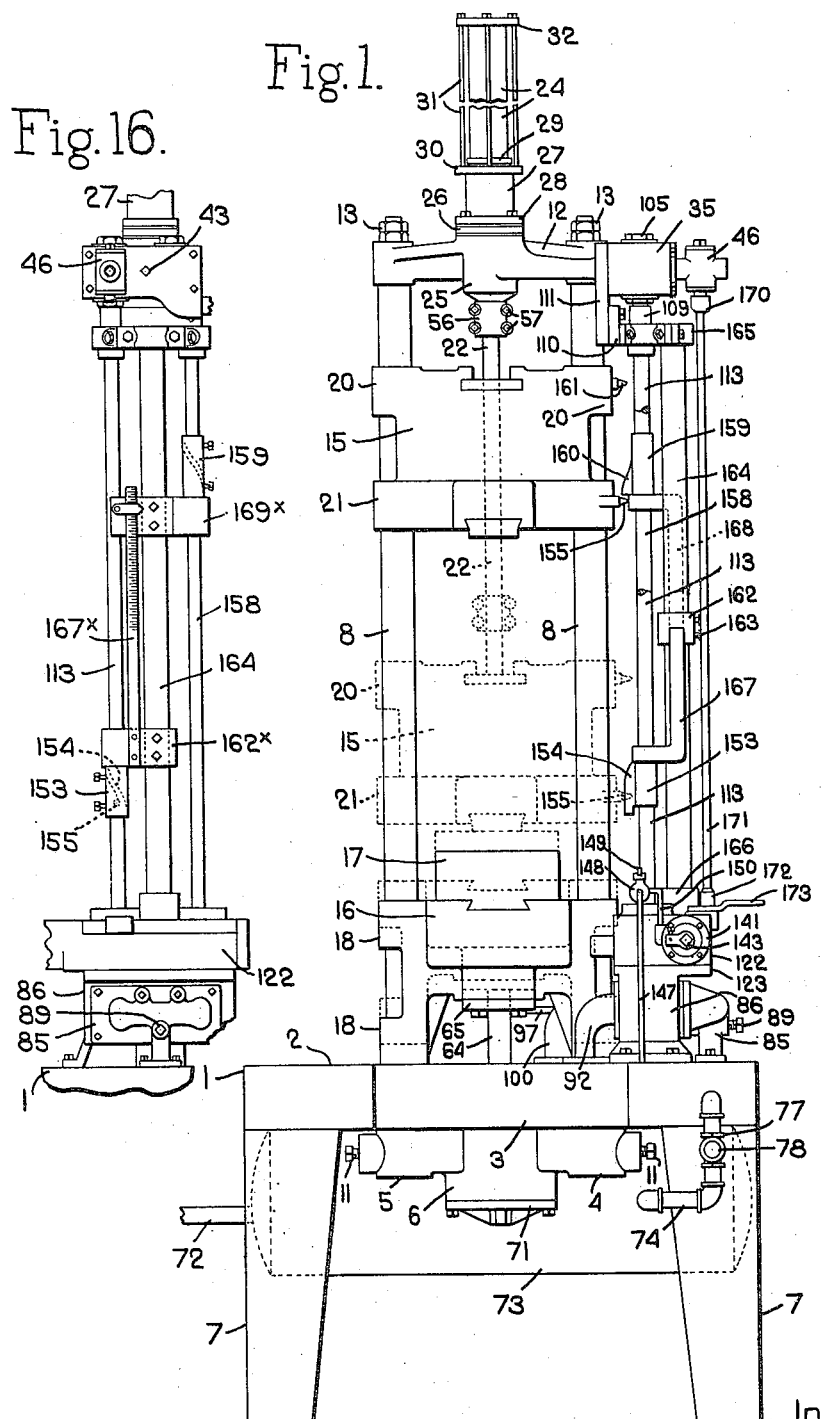

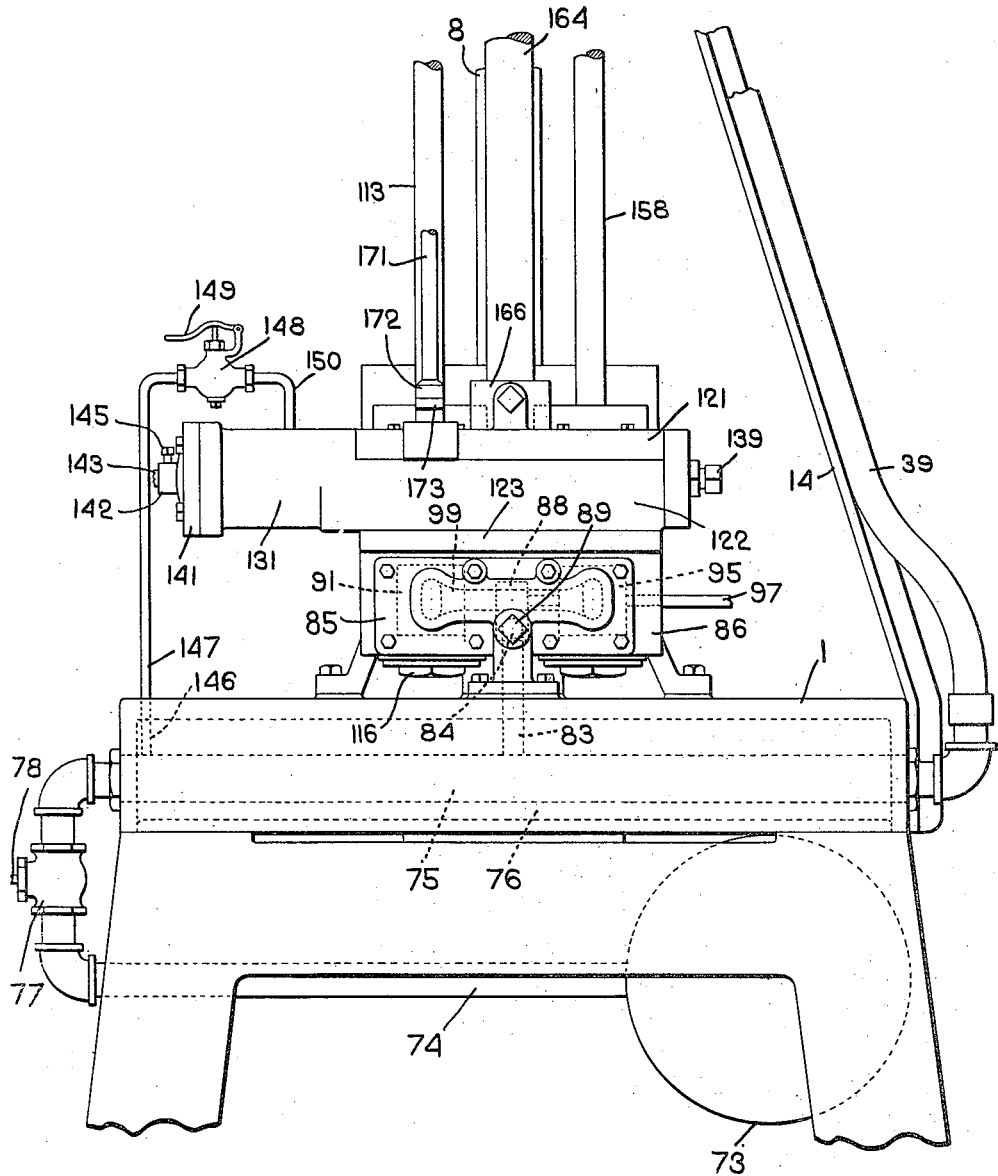

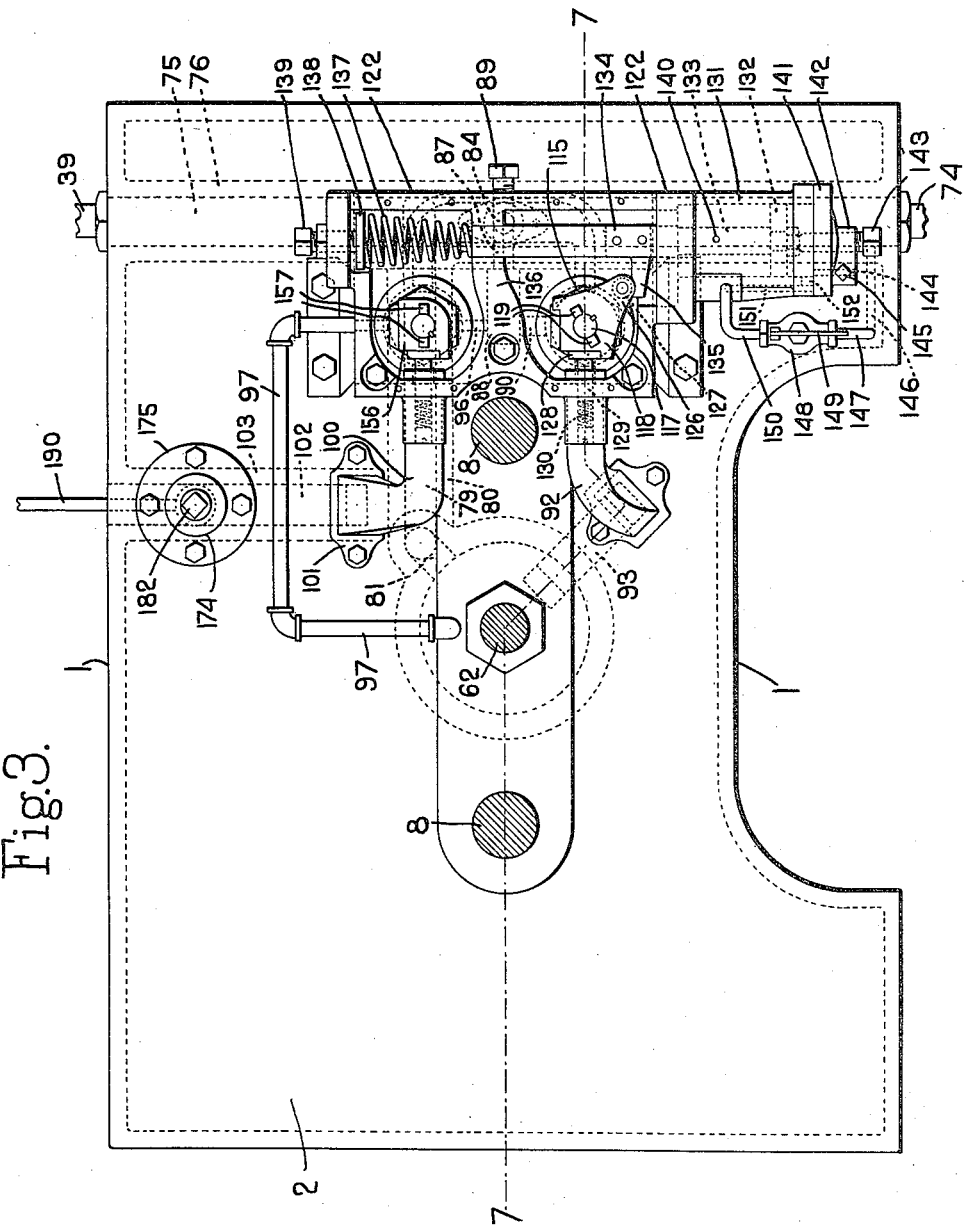

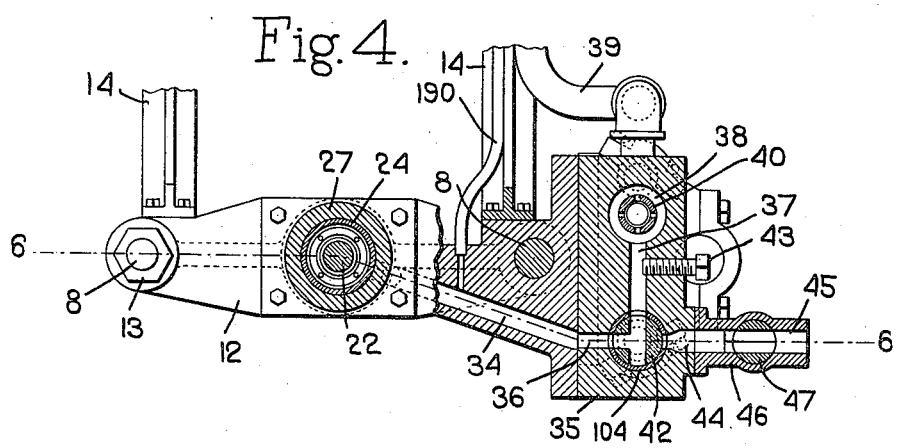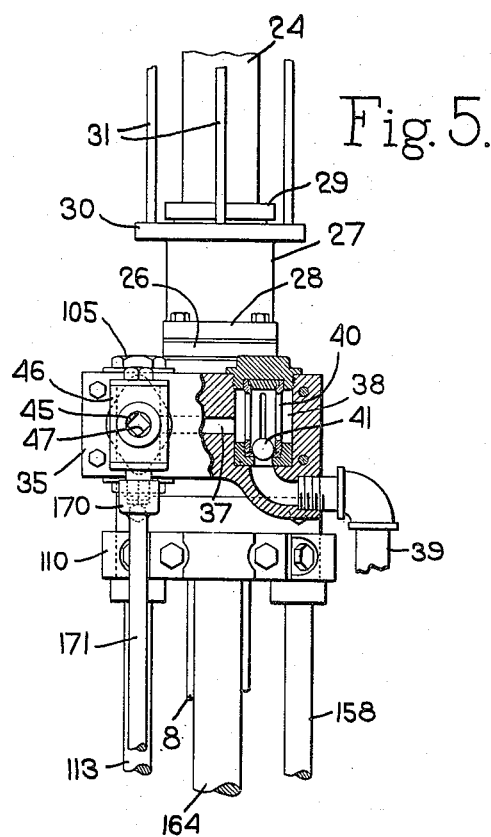

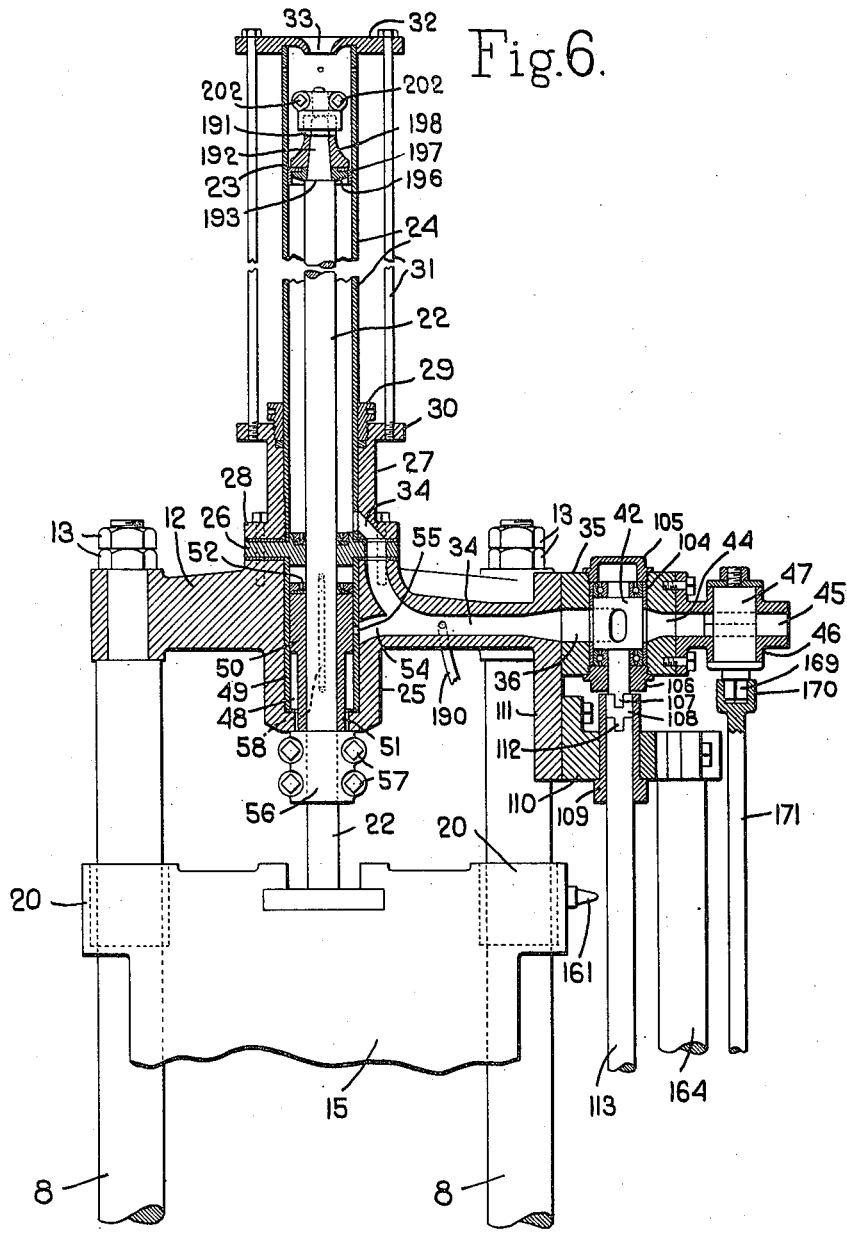

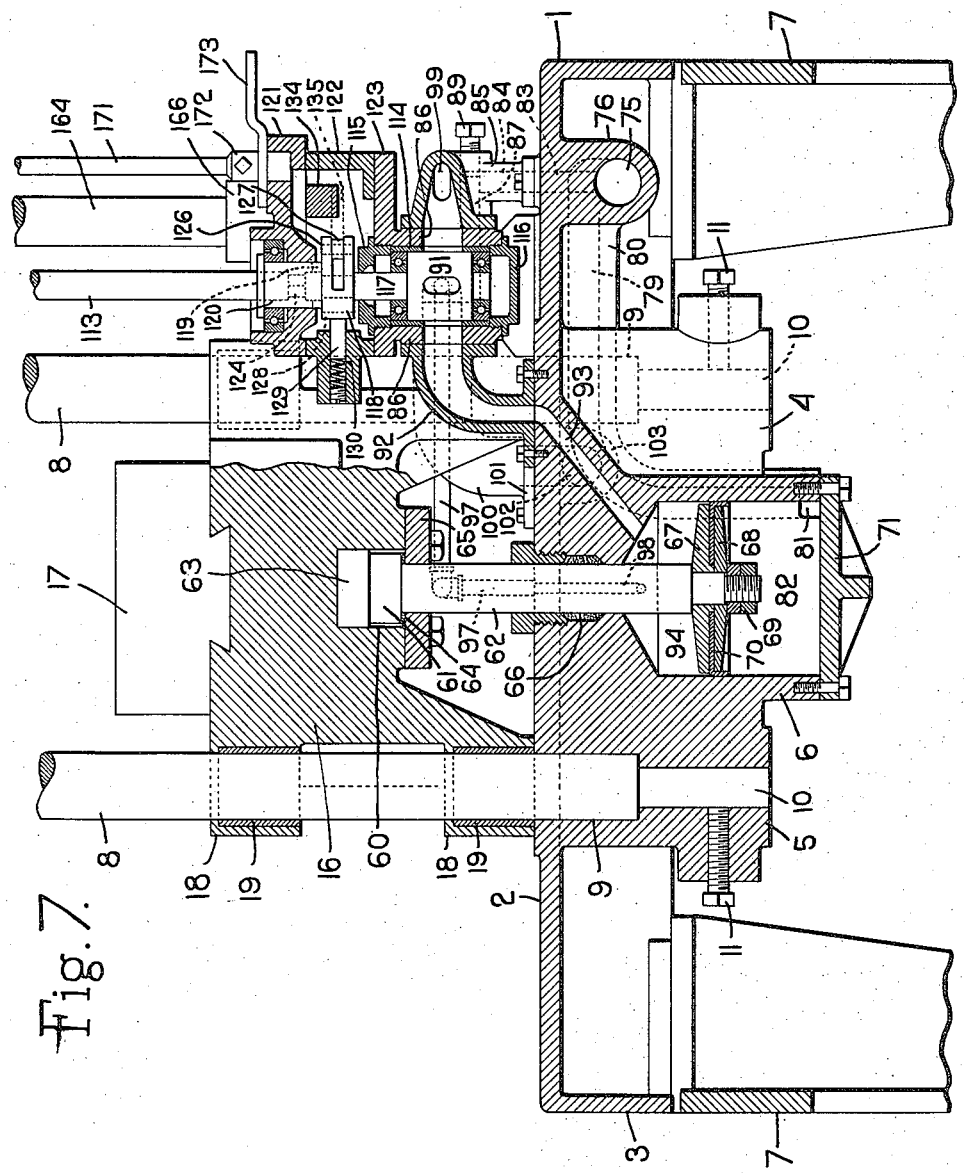

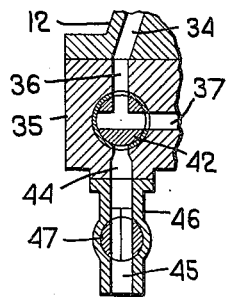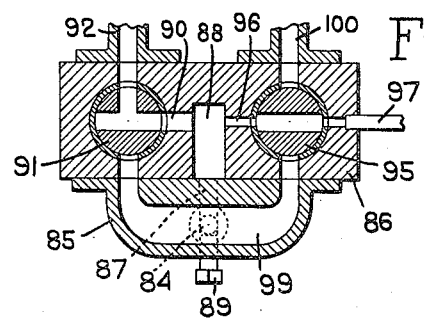
Fig.8.
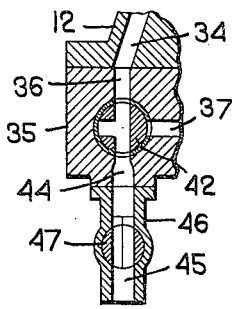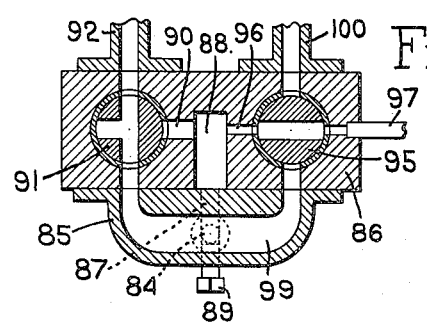
Fig.9.
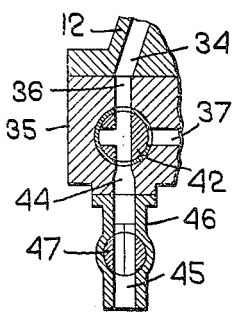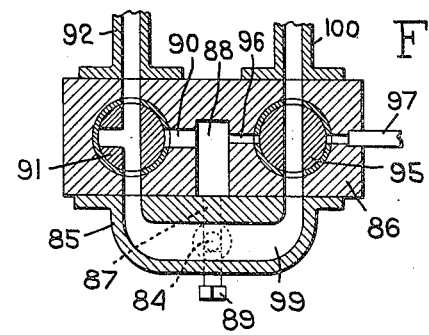
Fig.10.
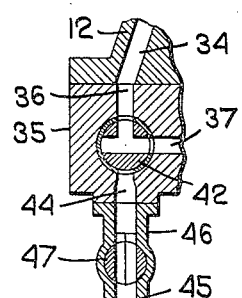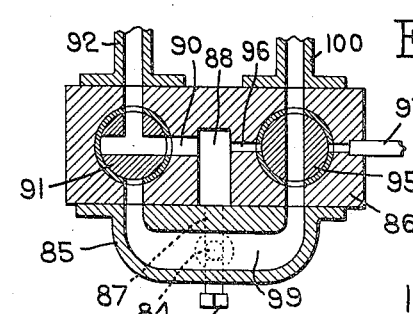
Fig.11.
Inventor.
Reginald P. Fitzgerald
by Heard Smith & Tennant.
Attys.

Inventor.
Reginald P. Fitzgerald
by Heard Smith & Tennant
Attys.

Patented Feb. 12, 1935

1,990,478

UNITED STATES PATENT OFFICE 1,990,478

DROP HAMMER

Reginald P. Fitzgerald, Braintree, Mass., assignor to Pneumatic Drop Hammer Company, Boston, Mass., a corporation of Massachusetts Application February 26, 1931, Serial No. 518,351

17 Claims. (Cl. 78—25)

This invention relates to improvements in drop hammers and one of the principal objects of the invention is to provide a drop hammer which can be used in buildings above the ground floor thereof without causing vibration to the buildings or the floors thereof.

Heretofore where drop hammers were installed in a building above the ground floor, two principal methods have been employed to wholly or partially relieve the structure of the building from vibration caused by the impact of the hammer head upon the anvil. One consists in mounting the anvil upon posts running down to the ground or basement, with the posts supported upon a bed of concrete or other solid base. This method entails considerable expense and renders useless valuable space on every floor through which the posts pass. The other method consists of various types of so-called spring boards upon which the anvil is mounted. Such spring board usually consists of timbers spanning floor beams supported by springs of one type or another. This method materially reduces the vibration transmitted to the building structure, but to a very great extent reduces the efficiency of the hammer.

Vibration caused by drop hammers, whether installed on concrete foundations below the ground floor or on posts, as above described, not only causes annoyance to the occupants of the building, but is likely to weaken the building structure, as the vibratory effect is often felt by an entire neighborhood, particularly where a number of heavy hammers are used and to such an extent that whole plants have been compelled to move from one locality to another by civic authority.

The purpose of the present invention is to provide a drop hammer of such construction that vibration heretofore caused by the impact of the relatively movable members will be eliminated so that the machine may be installed in any location provided with sufficient strength to support the weight of the machine without transmission of appreciable vibration to the support.

More specifically, the invention comprises a drop hammer having a frame, relatively movable power applying members supported thereby to reciprocate toward and from each other, with the paths of their centers of mass in alignment, means being provided for reciprocating said members, together with means for controlling the reciprocation thereof to cause the force exerted by each at the moment of impact to be absorbed by the other, thus preventing transmission of vibration to the frame.

A further object of the invention is to provide a drop hammer construction of the character above described, with means for regulating the force of the impact.

Another object of the invention is to provide a drop hammer comprising relatively movable power applying means having fluid-operating means acting upon one of the members at a substantially constant high pressure tending to force it toward the other member with means for counterbalancing the force of said constant pressure and operable, preferably by fluid under pressure, to separate said members, with means for controlling said counterbalancing means operable selectively to permit said constant pressure to propel the member actuated thereby toward said other member gradually, or rapidly, with substantially the full force of said constant pressure.

The present invention is particularly adapted for drop hammers such as are employed in producing work with dies, but may be employed in various other types of presses or hammers within the scope of the claims.

The invention is disclosed herein as applied to a drop hammer construction comprising a drop hammer and a reciprocable anvil, with power means for raising the hammer, a hammer control means operable to release the hammer from said power means to allow the hammer to drop, a separate power means to propel the anvil toward the hammer, and an anvil control means automatically operable in correlation with said hammer control means to cause said anvil-propelling means to project the anvil upwardly with sufficient force to impart to the anvil, while traveling a short distance, a momentum equal to the momentum acquired while dropping a relatively great distance, so that at the moment of impact the force of each is absorbed by the other, thereby preventing transmission of vibration to the frame.

This is accomplished in the preferred embodiment of the invention illustrated herein by providing means operable by fluid under pressure for lifting the hammer, subjecting the anvil preferably to a constant fluid pressure, tending to move the anvil upwardly, depressing the anvil by a counterbalancing fluid under pressure in addition to the weight of the anvil simultaneously with the lifting of the hammer, thereby separating the hammer and the anvil to potential positions of actuation for the blow, then producing the blow by exhausting the fluid under pressure from the hammer lifting means and simultaneously exhausting the counterbalancing fluid under pressure so that the anvil will be propelled toward the dropping hammer in such manner that the hammer and anvil will meet with equal momentum in a predetermined plane or zone.

A further feature of the invention consists in providing means for regulating the rate of exhaust of said fluid under pressure to vary the effective force of the blows produced by the impact of the hammer and anvil.

More specifically the invention comprises cooperating throttle valves in the exhaust conduits leading from the fluid-operated mechanism for raising the hammer and the fluid-pressure operated means for depressing the anvil, with means for conjointly actuating the same to control the effective blow of impact.

A further feature of the invention comprises manually-operable means for adjusting the throttle valve in the exhaust passage for the fluid acting upon the hammer, and a fluid-actuated throttle valve in the exhaust passage for the fluid acting upon the anvil, with means for controlling the actuation of the latter from the pressure within acting upon the hammer operable to cause the latter to correlate the rate of exhaust from the anvil-cylinder to that of the hammer-cylinder.

Another object of the invention is to provide a retarding or cushioning device for gradual arresting of the hammer at a predetermined upper limit of movement or height without imparting a shock or blow to the supporting frame. Such a device may be in the nature of a dash pot and the term "dash pot" is used herein as inclusive of any device which will effect this purpose. A further refinement of the invention consists in supplying the dash pot with fluid under pressure, preferably the same as that supplied to the hammer, and providing means for confining such fluid under pressure in the dash pot in such a manner as initially to resist the upward movement of the hammer as it approaches the predetermined height, with the full force of said fluid under pressure or a greater force, and subsequently gradually to release such pressure and thereby permit the hammer gradually to come to rest at said predetermined height.

These and other objects and features of the invention will more fully appear from the following description and the accompanying drawings, and will be particularly pointed out in the claims.

An illustrative embodiment of the invention is shown in the accompanying drawings as applied to a drop hammer construction comprising means operable by fluid under pressure for raising the hammer, and means operable by fluid under pressure for actuating the anvil, with suitable controlling means for causing the hammer and anvil to meet in a predetermined plane or zone, with substantially the same momentum, so that the force exerted by each at the moment of impact is absorbed by the other and no appreciable vibration imparted to the frame.

The drawings are made from a full size operative machine having a hammer weighing approximately one hundred pounds and which when operated has demonstrated fully that no substantial vibration is imparted to the frame by rapidly repeated blows of the hammer.

Certain of the mechanisms, which are disclosed in the present application, correspond to those disclosed in Letters Patent of the United States No. 1,924,545, granted August 29, 1933, to William H. J. Fitzgerald and Reginald P. Fitzgerald, for improvements in drop hammer.

In the drawings:

Fig. 1 is a front elevation of a drop hammer construction embodying the invention;

Fig. 2 is an enlarged side elevation of a lower portion of the construction illustrated in Fig. 1;

Fig. 3 is essentially a plan view of the base portion of the machine, the columns, upon which the hammer reciprocates, and the piston rod, which raises the hammer, being shown in horizontal section;

Figure 12:
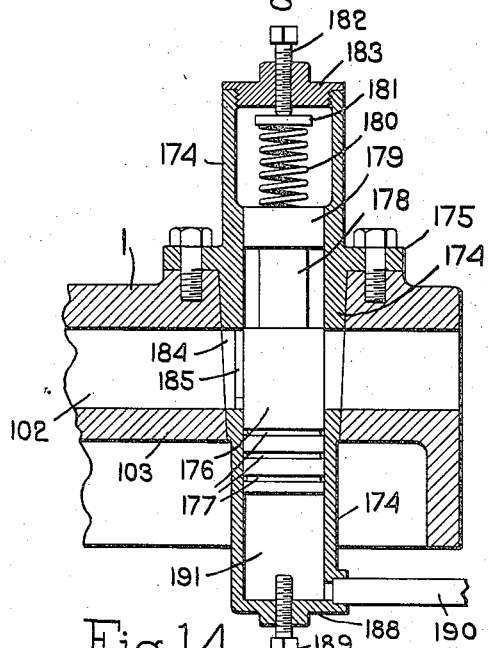
Figure 13:
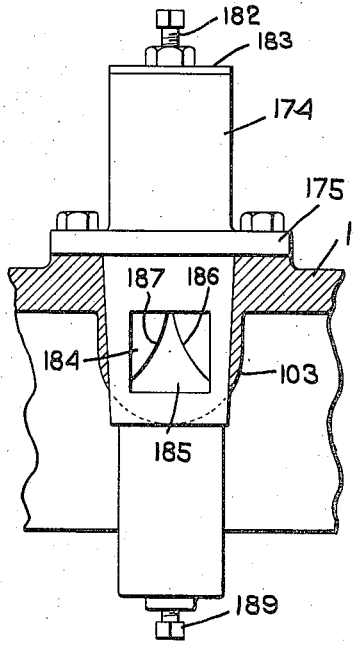
Figure 14:
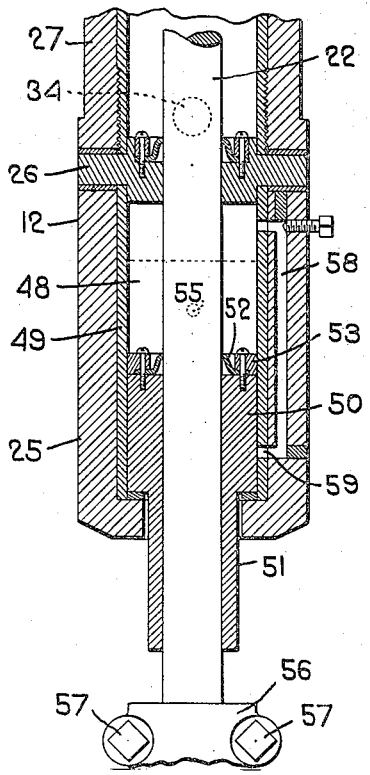
Figure 15:
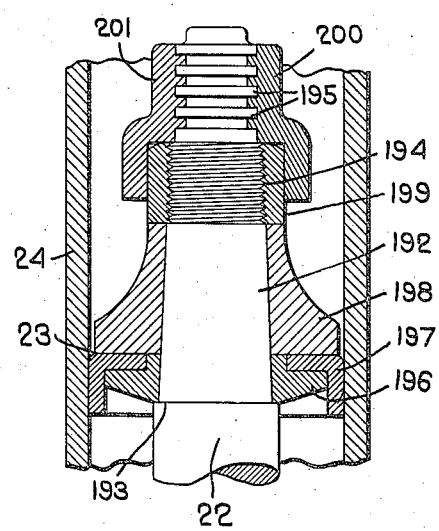

Fig. 4 is a plan view of a portion of the cylinder-supporting beam illustrating in horizontal section a portion of the piston and cylinder for raising the hammer, and also illustrating in horizontal section upon a different plane the portion of the cylinder-supporting beam, the valve block and valve, the conduit leading to the cylinder, the exhaust conduit, and the valve for controlling admission of fluid under pressure to the cylinder and exhaust of fluid therefrom;

Fig. 5 is a view, mainly in side elevation, viewed from the right toward the left, of the construction illustrated in Fig. 4, the inlet valve for preventing the escape of fluid under pressure being shown in vertical section;

Fig. 6 is a detail view of the upper portion of the power hammer construction showing the cylinder, the cylinder-supporting beam, the valve block, and the exhaust conduit in vertical section on the broken line 6—6, Fig. 4;

Fig. 7 is a view, mainly in vertical section, through the base, the anvil and valve mechanism for controlling the supply of fluid under pressure to the anvil-actuating cylinder, on the broken line 7—7, Fig. 3;

Fig. 8 comprises horizontal detail sectional views placed in juxtapositions of the valve mechanism for controlling the supply of fluid pressure to the cylinder and exhaust therefrom, and the valve mechanism for controlling the reciprocation of the anvil; the valves in this figure being shown in the position in which fluid under pressure is being supplied to the cylinder to raise the hammer and to the upper portion of the anvil cylinder to depress the anvil;

Fig. 9 is a similar view illustrating the position of the valves for controlling the supply of fluid under pressure to the hammer-raising cylinder and to the upper portion of the anvil-actuating cylinder when the valves have been rotated conjointly to positions to cut off the supply of fluid and to establish communication between the valve controlling the hammer-cylinder and the exhaust therefor;

Fig. 10 is a similar view illustrating the position of the valves when the valves for controlling the exhaust from the upper portion of the anvil-actuating cylinder has been rotated to exhaust position during the initial downward movement of the hammer;

Fig. 11 is a view similar to Fig. 8 showing the position of the valves when rotated near the end of the hammer stroke to initial position to admit fluid under pressure to the hammer-cylinder and to the upper portion of the anvil-cylinder, and further showing that the exhaust valve for the upper portion of the anvil-cylinder remains in communication with the exhaust passage until rotated to the position shown in Figs. 8 and 9 as the hammer approaches the upper limit of its movement;

Fig. 12 is a view, mainly in vertical section, of the valve mechanism for controlling the exhaust from the upper portion of the anvil-cylinder to correlate the accelerating momentum of the anvil to that of the dropping hammer;

Fig. 13 is a view, partly in section and partly in elevation, of the construction in Fig. 12, viewed from the left toward the right;

Fig. 14 is an enlarged detail view, mainly in vertical section, of the lower portion of the hammer-cylinder and dash pot constructions, the piston rod, which supports the hammer, being illustrated in elevation; and, Fig. 15 is an enlarged detail view, mainly in vertical section, showing the hammer-supporting piston and cylinder, and the means for securely connecting the piston to the piston rod.

Fig. 16 is a detail view of a modified construction for relatively adjusting the cam sleeves which coordinate the actions of the operating and exhaust valves.

In the drop hammer construction illustrated in the accompanying drawings the base 1 comprises a solid block, preferably of cast iron, or other suitable metal, of general rectangular form, (see Figs. 1, 3, and 7), presenting a substantially flat top or bed plate 2 provided with a downwardly extending peripheral flange 3 and a relatively thick, downwardly extending, central section integral therewith forming bosses 4 and 5 to receive the lower ends of the vertical columns upon which the hammer and anvil are reciprocably mounted, and a central boss 6, which is chambered to provide a cylinder for the piston which actuates the anvil. The base 1 and the superstructure are supported upon relatively light legs 7 which desirably are arranged at the corners of the base 1.

Vertical columns 8, which are accurately turned to present true cylindrical surfaces, are seated in sockets 9 in the bosses 4 and 5 of the base, and are provided with extensions 10 of relatively small diameter which desirably pass through the bosses 4 and 5 and are secured by set screws 11. The upper end portions of the columns 8 are turned down to present shouldered portions of smaller diameter which are screw threaded at their ends, and the cylinder-supporting beam 12 is mounted upon said shouldered portions and secured thereupon by suitable nuts 13, (see Fig. 6).

In order to insure rigidity and to prevent lateral vibration of the columns, braces 14 are secured at their upper ends to the cylinder-supporting beams, (see Fig. 4) and at their lower ends to the rear portion of the base, as illustrated in Fig. 2.

The hammer 15 and the anvil 16 are reciprocably mounted upon the cylindrical columns 8, the anvil being provided with a usual die block 17 having a dovetail connection to the anvil proper. The anvil is provided with widely separated upper and lower bearings 18 which are slidably mounted upon the columns 8 and are provided with countersinks extending upwardly from the bottom nearly through the said extensions to receive bushings 19 of suitable metal, such as bronze, which will be condensed by the repeated blow of impact of the anvil and hammer to maintain a perfect sliding fit upon the columns.

The hammer 15 likewise is provided with widely separated upper and lower extensions 20 and 21 which are provided with countersinks extending downwardly from the upper faces thereof to receive bushings similar to the bushings 19 of the anvil, and also adapted to be condensed to maintain a perfect sliding fit in the manner above described.

The accurate guiding of the hammer and anvil in the manner above described during their movement toward each other is particularly important in that the paths of movement of the centers of mass of the hammer and anvil are maintained in perfect alinement, so that at the moment of impact the force exerted by each will be absorbed by the other without any displacement of the hammer or anvil which would transmit vibration to the frame. Furthermore, such accurate guiding of the hammer and anvil will insure accurate registration of the dies carried by the hammer and anvil when the drop hammer is employed in die-shaping or die-forging.

The hammer is connected to the lower end of a piston rod 22 which extends upwardly through the central portion of the cylinder-supporting beam 12 (Fig. 6) and is connected at its upper end to the piston 23 of a cylinder 24 which is carried by the cylinder-supporting beam. Preferably the central portion of the cylinder-supporting beam is provided with a downwardly extending boss 25 which is chambered to provide a dash pot and a plate 26, secured to a faced central portion, forms a base for the lower end of the cylinder 24. The cylinder 24 is secured to the plate 26 by a sleeve 27 having at its lower end an annular flange 28 which is secured to the cylinder-supporting beam by bolts or machine screws which pass through the flange 28 and the plate 26 into the cylinder-supporting beam 12.

Desirably the lower portion of the cylinder 24 is provided with a screw threaded lower end portion which engages complementary internal screw threads upon the sleeve 26. The upper end of the sleeve 26 is provided with an internally screw threaded portion which is engaged by complementary screw threads upon a collar 29 which fits closely upon the cylinder 24 and together with a suitable packing provides a gland for preventing the escape of fluid under pressure between the cylinder and the sleeve.

The upper portion of the sleeve is provided with an outwardly extending flange 30 which receives the screw threaded ends of bolts 31, the heads of which engage a cap 32 having an undercut central portion which engages and holds the upper end of the cylinder 24. The bolts 31, therefore, serve to secure the cylinder rigidly to the sleeve which in turn is rigidly secured to the cylinder-supporting beam, thereby providing a rigid construction which will avoid the likelihood of breakage of the cylinder. The cap 32 is provided with a central aperture 33 and the walls of the under-cut lower portion of the cap desirably curve downwardly to present converging surfaces adapted to obstruct and return any lubricant which may be blown upwardly between the contiguous walls of the cylinder and piston as disclosed in the prior application Serial Number 321,225 aforesaid.

For convenience in description the cylinder 24 will hereinafter be referred to as the "hammer-cylinder" and the cylinder for actuating the anvil will be referred to as the "anvil-cylinder".

Any suitable means may be provided for supplying fluid under pressure to the hammer-cylinder and the anvil-cylinder which are provided with suitable valves and valve-actuating mechanism to control the supply of fluid to the respective cylinders and to exhaust fluid under pressure therefrom in the manner hereinafter set forth. The mechanism for thus controlling the lifting and release of the hammer and equivalent constructions is referred to herein as the "hammer control means".

In the present construction the cylinder-supporting beam is provided with a conduit 34 extending inwardly from one end thereof and communicating through suitable passages with the lower end of the cylinder. A valve block 35, which is secured to the end of the cylinder-supporting beam, is provided with a passage 36 which communicates with the conduit 34 and is also provided with an inlet passage 37 at right angles to the passage 36 which communicates with a valve chamber 38 to which fluid under pressure is supplied by a pipe 39. The valve chamber 38 is provided with a cylindrical valve cage 40 of smaller diameter containing a ball valve 41 which rests upon a valve seat at the bottom of the cage. A three-way controlling valve 42 is located at the junction of the passages 36 and 37. In order to insure accuracy and ease of operation of the valve 42, it desirably is provided with upper and lower ball bearings so constructed and arranged as to provide an oil seal which will prevent the escape of fluid under pressure in the manner disclosed in the prior application Serial Number 321,225 to which reference has been made.

Desirably adjustable means are provided for restricting the flow of fluid under pressure through the passage 37. In the present construction this comprises a screw 43 which passes through the wall of the block into the passage 37 and is of such size that by adjusting it inwardly or outwardly the cross sectional area of the passage may be varied as desired. The valve block 35 is also provided with a passage 44 in alinement with the passage 36 which communicates with an exhaust pipe 45 in a valve casing 46 which is bolted to the outer face of the valve block 35, and is provided with a valve chamber having therein a restricting valve 47 provided with a diametric port of angular cross section adapted, as the valve is rotated about its axis, to vary the cross sectional area of the exhaust passage and thereby regulate the rate at which fluid under pressure is discharged from the cylinder.

In the construction thus described the admission of fluid under pressure from the supply pipe 39 is controlled by the rotation of the valve 42 which, when in the position shown in Fig. 4, will permit the introduction of air into the cylinder to raise the hammer and which, when rotated a quarter turn to establish communication between the passages 36 and 44, will permit the escape of air, and thereby allow the hammer to drop as in usual drop hammer constructions.

Where the hammer is thus raised by fluid under pressure, the momentum of the upwardly moving hammer will cause it to strike the cylinder-supporting beam with considerable force. Means, such as springs or buffers, have been heretofore provided in some instances for cushioning the blow of the hammer upon the cylinder-supporting beam.

One of the objects of the present invention is to provide means for effectively checking the upward movement of the hammer and gradually causing it to come to rest at a predetermined height. Such mechanism comprises a dash pot which may be secured to, or, as illustrated herein, preferably formed integral with the cylinder-supporting beam.

In the preferred construction illustrated in Figs. 6 and 14, the dash pot comprises a chamber 48 extending downwardly through the central portion of the cylinder-supporting beam 12 and its integral boss 25 nearly to the lower end of the boss 25, the chamber 48 desirably being provided with a cylindrical lining or bushing 49. A dash pot plunger, having a head 50 fitting the cylinder and an extension 51 of relatively small diameter extending through an aperture in the lower end of the boss 25, is reciprocably mounted upon the piston rod 22. An upwardly converging packing 52, of leather or other suitable material, which closely fits upon the piston rod 22, is secured upon the upper end of the plunger head 50 by a collar 53 secured to the head.

Means are provided for admitting fluid under pressure to the dash pot. In the preferred construction illustrated this is accomplished by providing the conduit 34, which extends lengthwise of the cylinder-supporting beam 12, with a branch 54 which communicates with a port 55 in the lining or bushing 49 of the dash pot which is located above the upper end of the plunger 50 when the latter is in its lowermost position, but adapted to be closed by the plunger head as it is raised.

The plunger 50 of the dash pot is actuated upon the upward movement of the hammer by a collar or stop 56 desirably formed of flanged semi-cylindrical members which are clamped together by suitable screws 57 upon the piston rod 22 at such distance from the hammer as may be desirable to arrest the hammer at a predetermined upward limit of its movement.

By reason of this construction the collar 56 will, as the hammer approaches the upper limit of its movement, engage the extension 51 of the dash pot plunger and raise the dash pot plunger against the resistance of the fluid under pressure which is supplied through the branch 54 leading to the hammer-cylinder until the head 50 of the dash pot is raised sufficiently to close the port 55.

In order to permit the hammer gradually to come to rest at the upper limit of its movement, means are provided for permitting the gradual escape of fluid from the dash pot chamber upon further upward movement of the dash pot plunger. This is accomplished in the preferred embodiment of the invention disclosed herein by providing a restricted by-pass 58, the upper end of which communicates with a port 59 adapted to be uncovered when the head of the dash pot plunger has been raised sufficiently to close the port 55. It follows, therefore, that after the lower end of the plunger head has uncovered the port 59, the air, which is confined in the chamber 48 of the dash pot, will gradually escape through the restricted by-pass 58 until the hammer has come to rest. Desirably an adjusting screw 58× extends into the by-pass in alignment with the port leading from the cylinder thereto, to permit regulation of the escape of fluid from the cylinder through the by-pass, thereby regulating the rapidity with which the remaining movement of the hammer is arrested.

When the operating valve for the hammer-cylinder has been rotated to exhaust position, the hammer will drop and thereupon the plunger 51 will be permitted to drop by gravity to its lowest position illustrated in Fig. 14. After the hammer has struck its blow and fluid under pressure is again admitted to the hammer-cylinder to raise the hammer, the fluid pressure in the dash pot chamber will be re-established by the supply through the branch 54 from the conduit 34, as above described.

The most important object of the present invention is to provide means for reciprocating the anvil in correlation to the reciprocation of the hammer in such a manner as to cause the hammer and anvil to meet with equal momentum at a predetermined plane or within a predetermined narrow zone, with consequent elimination of objectionable vibration, characteristic of all previous designs of drop hammers of the stationary anvil type.

In the construction illustrated the anvil 16, (see Figs. 1 and 7) which is slidably mounted upon the columns 8, is provided with a central recess 60 which receives the upper enlarged end 61 of a piston rod 62, a packing of rubber 63, or other suitable non-metallic material, being interposed between the upper end 61 of the piston rod and the body of the anvil. A washer 64, of fibrous material, is interposed between the lower face of the enlargement 61 of the piston rod and a cap or keeper 65 which slidably fits the piston rod 62 and is bolted to the under face of the anvil 16.

The piston rod 62 extends through a vertical bore or aperture in the downwardly extending boss 6 of the bed 2, and a suitable bushing or packing 66 in a counterbore of said aperture fits upon the piston rod 62. The lower end of the piston rod 62 is provided with a screw threaded extension of smaller diameter presenting a shoulder to which is secured a piston preferably formed of circular plates 67 and 68 which are secured upon the extension of the piston rod by suitable nuts 69.

The plates 67 and 68 clamp between them an annular packing member 70, of leather or other suitable material, the edge portions of which extend over the periphery of the piston member 68 which is of slightly smaller diameter than that of the piston member 67. The piston is reciprocably mounted in a cylinder formed by boring upwardly from the under face of the boss 6. The lower end of the cylinder is closed by a cylinder head 71 which is bolted to the carefully surfaced lower end of the boss 6. If desired a suitable gasket or packing may be interposed therebetween.

Any suitable means may be provided for introducing fluid under pressure to the anvil-cylinder with suitable means for controlling the same to produce the function herein described. In the construction illustrated herein fluid under pressure is supplied by a suitable compressor, (not shown) through a pipe 72 to a storage tank 73 which is mounted on the main frame beneath the bed of the machine. A pipe 74, which communicates with a conduit 75 in and extending longitudinally of a boss 76, which extends downwardly from the under face of the top of the bed and preferably throughout the width thereof. The pipe 74 desirably is made in sections connected by a valve casing 77 having a manually operable valve 78 so that the fluid under pressure may be cut off from the hammer and anvil actuating mechanisms when dies are being installed or replaced or when it is otherwise desirable to prevent the operation of the machine, or when the machine is temporarily idle.

The pipe 39, through which fluid under pressure is supplied to the hammer-cylinder, desirably communicates with the opposite end of the conduit 75, and for convenience in supporting the same extends upwardly along one of the braces 14 for the cylinder-supporting beam.

The conduit 75 also communicates with a conduit 79 in another boss 80 which extends downwardly from the under face of the bed 1 and which curves downwardly alongside and is integral with the downwardly extending cylinder boss 6. The conduit 79 has a port 81 at its lower end which communicates with the lower chamber 82 of the anvil-cylinder thereby supplying continuously fluid under full pressure from the tank 73 to the lower chamber 82 of the anvil cylinder. By reason of this construction the fluid under pressure thus supplied exerts a force continuously tending to propel the anvil upwardly. Another conduit 83, extending upwardly from the conduit 75 approximately midway of its length, communicates with an L-shaped conduit 84 in a casting 85 which is bolted to the bed of the machine and to the face of a valve block 86. The lateral branch 87 of the conduit 84 communicates with the chamber 88 in the center of the valve block 86. A screw 89, extending through the walls of the casting 85 into the passage 83 preferably at the junction thereof with the conduit 87, provides means for restricting the supply of fluid under pressure through the conduit 87 to the chamber 88 of the valve block.

A horizontal passage 90 in the valve block, which communicates with the chamber 88, leads through a three-way valve 91 to a pipe 92 preferably in the form of a casting having one flanged end secured to the valve block and the other flanged end secured to the top of the base 1 of the machine. The other end of the pipe 92 communicates with a conduit 93 which leads to the upper chamber 94 of the anvil cylinder. When, therefore, the valve 91 is in the position shown in Figs. 8 and 11, communication is established directly from the pressure tank 73 through the conduit 83, its branch 87, with the chamber 88 of the valve block, and thence through the conduit 90, pipe 92, and conduit 93, with the upper portion of the cylinder.

Since the effective area of the lower side of the piston is greater than the effective area of the upper side thereof, because of the presence of the piston rod, and inasmuch as the fluid which is supplied to the upper chamber 94 of the anvil cylinder is at the same pressure as that which is supplied through the conduit 79 to the lower chamber 82 of the cylinder, the force exerted upwardly by the fluid will exceed that exerted downwardly by the fluid in the upper chamber 94 of the cylinder in proportion to the difference in the affected area of the opposite sides of the piston— which is dependent upon the diameter of the piston rod.

By employing a piston rod of a suitable diameter, the weight of the anvil and the piston rod connected thereto, together with the fluid pressure exerted in chamber 94 upon the reduced area of the piston will overbalance the pressure in the lower chamber 82 of the cylinder, so that the anvil will descend until it rests upon the base of the machine.

If, therefore, the fluid under pressure in the upper chamber 94 of the anvil-cylinder is released, the continuous pressure of the fluid in the lower chamber 82 of the cylinder will force the anvil upwardly with a rapidly accelerating movement. This accelerating movement of the piston may be so controlled as to cause the anvil to meet the descending hammer with equal momentum at a predetermined plane or zone. Furthermore, by supplying fluid under high pressure, the anvil may be given such a rapidly accelerating movement that sufficient momentum will be imparted to it in a short distance as to equalize the momentum of the hammer dropping through a relatively greater distance. As a matter of fact, in the machine from which the drawings of this application were made, the anvil, when propelled by fluid under pressure a distance of approximately one inch acquires the same momentum as that of the hammer dropping by gravity a distance of approximately fourteen inches.

The valve 91, which supplies fluid to the upper chamber 94 of the anvil-cylinder, is co-ordinated with the valve 42 through which fluid under pressure is supplied to the hammer-cylinder 24, preferably being connected so that the valves 91 and 42 are rotated in unison both to supply fluid under pressure to the hammer and anvil cylinders and to release the fluid under pressure from both simultaneously. The valve mechanism above described for controlling the release of fluid pressure from the upper portion of the anvil cylinder, or its equivalent, which enables the anvil to be propelled upwardly by the force of constant fluid pressure, will be referred to herein as the "anvil control means".

In view of the fact that the initial acceleration of the dropping hammer is relatively slow, it is desirable to delay the initial upward movement of the anvil. This is accomplished by providing an exhaust valve for the fluid under pressure released from the anvil-cylinder which remains closed during the initial dropping movement of the hammer, but is rotated into exhaust position by the hammer after the hammer has descended a predetermined distance. In the meantime, means are provided for supplying fluid under pressure through the exhaust valve to the upper chamber 94 of the anvil-cylinder, thus maintaining the pressure therein during such initial dropping movement of the hammer, although the operating valve 91 is rotated to exhaust position.

The exhaust valve 95 is rotatably mounted in the valve block 86 and has a diametric port therethrough which, when the hammer is in raised position, communicates with a conduit 96 leading to the chamber 88 in the valve block, and also communicates with a pipe 97 which communicates with a bore or passage 98 in the bed which leads to the upper chamber 94 of the anvil-cylinder, to maintain pressure in the upper chamber 94 of the anvil-cylinder when the valve 91 is rotated to the position in which it cuts off the supply of fluid under pressure through the conduit 93 to the chamber 94.

The casting 85 is provided with a horizontal passage 99 which communicates with the valves 91 and 95, and an exhaust pipe 100, having at one end a flange secured to the rear face of the valve block 86, and at the other end a flange 101 secured to the upper face of the base 1, communicates with an exhaust passage 102 in a boss 103 which extends downwardly from and is integral with the base 1 of the machine. A regulating valve, which is located in the exhaust passage 102, is co-ordinated with the regulating valve for controlling the exhaust from the hammer-cylinder in the manner which will hereinafter be described for the purpose of controlling the forces of impact of the blow produced by the meeting hammer and anvil.

Any suitable means may be provided for actuating the operating valve which controls the supply of fluid to the hammer-cylinder 24 and the upper chamber 94 of the anvil-cylinder and the release of pressure therefrom, and suitable mechanism may be employed to actuate the exhaust valve 95 in co-ordination therewith to produce the delayed release of fluid under pressure from the upper chamber 94 of the anvil-cylinder for locating the plane of impact of the hammer and anvil.

Any suitable means may be provided for co-ordinating the movements of the operating valves which control the supply of fluid under pressure to the hammer-cylinder and the upper chamber of the anvil-cylinder and the release of the fluid under pressure therefrom. In the construction illustrated herein this is accomplished by connecting the operating valve 42 for the hammer-cylinder and the operating valve 91 for the upper chamber of the anvil-cylinder by an actuating rod and providing fluid-controlled means for rotating the rod a quarter turn to exhaust position, and means operable by the dropping of the hammer to restore the valves to the position in which fluid under pressure is admitted therethrough to the respective cylinders.

In the preferred construction illustrated the operating valve 42 for the hammer-cylinder (Fig. 6) is a cylindrical valve which is rotatably mounted in a sleeve or bushing 104. The valve is provided with upper and lower reduced portions forming stems which are mounted in upper and lower ball bearings held in place by an upper cap 105 and a lower cap 106 screwed into the valve block 35 and abutting against the upper and lower ball races and preferably also against the upper and lower ends of the bushing 104. The upper valve cap desirably is chambered to provide a lubricant reservoir which will insure a proper lubrication of the valve and also will maintain an oil seal between the valve and the bushing.

The lower extension or valve stem is provided with a flat extension 107 which engages a complementary seat in a narrow cylindrical coupling 108 which is rotatably mounted in a sleeve 109 extending through a bracket 110 which is secured to a downwardly extending flange 111 upon and integral with the cylinder-supporting beam. The coupling 108 is provided with a flat downward extension 112 which engages a complementary socket in the upper end of the valve rod 113 which connects the upper operating valve 42 and the lower operating valve 91.

The lower operating valve 91 is likewise of cylindrical form and rotatably mounted in a bushing 114 in the valve block 86, (Fig. 7). The valve 91 likewise is provided with reduced extensions or stems which are mounted in upper and lower ball bearings interposed between said extensions and the bushing. The ball bearings are held in place by upper and lower caps, preferably hollow caps 115 and 116, which abut against the outer races of the respective ball bearings, and also preferably against the opposite ends of the bushing 114. The caps 115 and 116 desirably are also hollow and provide lubricant reservoirs for the purpose above described.

The upper valve stem 117 has an upper portion of reduced diameter which extends into and is keyed to a valve-actuating block 118, the upper face of which is provided with fins 119 which seat in complementary recesses in the under face of a cylindrical coupling member 120 which is rotatably mounted in ball bearings in a thickened portion of a boss upon the cover 121 of a box or casing 122 for the valve-actuating mechanism. The box or casing 122 is mounted upon a seat 123 which desirably comprises an integral flange extending from the upper end of the valve box 86.

The upper end of the coupling 120 is provided with an annular flange which overlies the inner race of the ball bearing. The coupling 120 is provided with a vertical central cylindrical bore extending partway through the coupling and communicating with a preferably rectangular socket adapted to receive a complementary rectangular end portion 124 of the valve rod 113.

By reason of the lower and upper connections of the valve rod 113 and the valves 42 and 91 by the couplings above described, the assemblage of the parts is greatly facilitated and the couplings also permit sufficient flexibility to avoid strains upon the valves which might cause them to bind or wear.

The valve stem 117 of the valve 91, which is secured to the block 118, (Figs. 3 and 7), is provided with a laterally extending bifurcated arm 126 between the ends of which a roller 127 is mounted and which is adapted to be engaged by an actuating arm. The block 118 is provided with flat surfaces positioned at right angles to each other adapted to be engaged by the head 128 of a retaining plunger having a stem 129 slidably mounted in a boss extending outwardly from the rear wall of the box or casing 122. A spring 130, which is interposed between the end of the plunger 129 and a screw threaded plug in the end of the boss, serves to hold the head 128 of the plunger in engagement with one or the other of the flat surfaces upon the block 125. The flat surfaces of the block 125 are produced by recessing the block in such a manner as to present shoulders adapted to engage the sides of the plunger head to prevent overthrow of the block when actuated in either direction. The spring-actuated plunger, therefore, acts as a stop to insure proper positioning of the operating valves both in inlet and exhaust positions.

Any suitable controlling means may be employed for rotating the block 118 in a direction to place the valves in exhaust position. In the preferred construction illustrated herein this is accomplished by fluid-operated controlling means comprising a cylinder 131, (Fig. 3) which is secured to or preferably formed integral with the end of the box or casing 122. A piston 132 is reciprocably mounted in the cylinder 131 and is provided with a piston rod having a cylindrical portion 133 reciprocably mounted in the end wall of the box or casing 122 and is provided also with a rectangular portion 134 which has secured to it an arm 135 adapted to engage the roller 127 and thereby rotate the block 118, the valve stem 117 and the valve rod 113 in a direction to place the valves 42 and 91 in exhaust position.

The opposite end of the rectangular portion 134 of the piston rod is slidably mounted in an integral web 136 extending transversely of the box or casing 122. A spiral spring 137, abutting at one end against the end of the rectangular portion of the piston rod and at its opposite end against a plate 138 which is backed by an adjustable stop screw 139, tends to restore the piston to normal position.

The rear portion of the cylinder 131 is provided with a small exhaust port 140 beyond which the piston head 132 passes before the arm 135 of the piston rod 134 rotates the operating valve to exhaust position. This exhaust port prevents the building up of an excess pressure of fluid in the cylinder by the air admitted through the valve 148 when the valve is open and upon closing of the valve permits the escape of air from the cylinder to enable the spring 137 to force the piston forwardly. The head 141 of the cylinder 131 is provided with a forwardly extending boss 142 through which an adjustable stop screw 143 extends, the end of the stop screw being positioned in such a manner as to be engaged by the end of the piston rod 133, and thereby arrest the piston 132 in a predetermined position. A vent aperture 144 extends through the cylinder head 141 and its boss 142 and provides means permitting the gradual escape of fluid from the forward end of the cylinder 142 when the piston is returned to normal position, illustrated in Fig. 3, by the action of the spring 137. The cross sectional area of the vent port 144 is regulated by an adjusting screw or valve 145 which is mounted in the boss 142.

Suitably controlled means are provided for actuating the piston 132 by fluid from the main supply. In the construction illustrated a branch conduit 146, which desirably is formed in the bed 1, communicates at one end with the conduit 75 which is supplied from the main pressure tank and at its other end communicates with a pipe 147 which leads to a valve casing 148 having therein a manually-operable, spring-closed valve controlled by a handle 149. A pipe 150, which extends from the opposite end of the valve casing, communicates with a conduit 151 formed in the wall of the cylinder 131 and which leads to a port 152 to the front end of the cylinder 131.

In operation, therefore, depression of the handle 149 will permit fluid to flow from the fluid pressure supply into the front end of the cylinder 131, thereby forcing the piston rearwardly and causing the arm 135 upon the piston rod to engage the roller and upon further movement to rotate the valves 42 and 91 to exhaust position in which the valves will be held by the engagement of the plunger head 128 with the flat face of the block 118 which is at right angles to that which is normally engaged by the plunger head, as illustrated in Fig. 3. Inasmuch as the fluid under pressure is thus introduced much more rapidly than it can escape through the vent 144, operation of the piston 132 will be insured, while upon closing of the valve the fluid under pressure in the front end of the cylinder will gradually escape through the port 144, so that the piston will be gradually restored to its normal position by the action of the spring 137, the valves meantime being held in exhaust position by engagement of the plunger head 128 with the flat face upon the block 118, as aforesaid.

In order to restore the valves to normal position the valve rod 113 is provided with a sleeve 153 having a longitudinally extending flange 154 provided with a cam groove adapted to be engaged by a pin or projection 155 extending outwardly from the lower extension 21 of the hammer, the groove in the flange 154 being so constructed that during the descent of the hammer, engagement of the pin 155 therewith will rotate the rod 113 a quarter turn in the reverse direction from that in which it was rotated by the movement of the piston 132.

The sleeve 153 is so positioned as to rotate the valves to inlet position slightly before the hammer and anvil strike each other, so that air under pressure will be introduced into the hammer-cylinder 24 and also into the upper chamber 94 of the anvil-cylinder immediately when the blow is struck and will catch the hammer upon its rebound and thereafter continue to force the hammer upwardly. The admission of fluid under pressure to the chamber 94 of the anvil-cylinder will also immediately upon the striking of the blow begin to restore the balance of fluid pressure upon the opposite sides of the piston 67 in the anvil-cylinder, so that the depression of the anvil will immediately follow.

It is desirable that the release of pressure upon the upper chamber 94 of the anvil-cylinder be slightly delayed after the beginning of the release of fluid under pressure from the hammer-cylinder for such period as may be necessary to cause the anvil to rise to a predetermined plane of impact of the hammer and anvil. This is accomplished by providing an exhaust valve which remains closed at the time fluid under pressure is initially released from the hammer-cylinder, but which is rotated to exhaust position after the hammer has descended a predetermined distance.

In the construction illustrated the exhaust valve 95 (Fig. 3) heretofore described, which is mounted in the valve block 86, is of similar construction to the operating valve 91, but is provided with a single diametric port therethrough. The valve 95 desirably is supported upon ball bearings of the character illustrated and described with respect to the operating valve 91, and is provided with an upwardly extending valve stem, (Fig. 3), having mounted upon it a block 156 provided with diametrically extending fins 157 which engage a coupling similar to the coupling 118 connecting the same to an exhaust valve rod 158 (Figs. 2 and 5), the upper end of which is mounted in the bracket 110 which is secured to the end of the cylinder-supporting beam. The block 156 is also provided with flat faces adapted to be engaged by a spring-actuated plunger to insure proper positioning of the valve.

The rod 158 has upon it a sleeve 159 provided with a longitudinally extending flange 160 having a cam groove adapted to be engaged by a pin or stud 161 projecting from the upper extension 20 of the hammer. When, therefore, fluid under pressure is released from the hammer-cylinder and the hammer permitted to drop, the pin 161 will, upon engagement with the cam slot in the flange 160 of the sleeve 159, rotate the valve rod 158 ninety degrees and thereby rotate the exhaust valve 95 to exhaust position, (Figs. 9 and 10), thus releasing fluid under pressure from the upper chamber 94 of the anvil-cylinder, whereupon fluid under full pressure in the lower chamber 82 of the anvil-cylinder will propel the anvil toward the descending hammer with such force and acceleration as to cause it to meet the hammer in a predetermined plane or narrow zone of impact.

The relative positions of the operating valve 42, which controls the supply of fluid under pressure to the hammer-cylinder and the exhaust therefrom; the operating valve 91 which controls the admission and release of fluid under pressure from the upper chamber 94 of the anvil-cylinder, and the exhaust valve 95 which controls the exhaust from the upper chamber 94 of the anvil-cylinder, are illustrated in Figs. 8, 9, 10, and 11 of the drawings.

Fig. 8 shows the valves in normal position with the hammer raised and the anvil depressed. The fluid under pressure flows from the pressure storage tank 73 through the pipe 74, conduit 75, pipe 39, inlet valve 38, conduit 37, and valve 42, and enters the hammer-cylinder through the conduit 34. At the same time fluid under pressure flows from the pressure storage tank 73 through the pipe 74, conduits 75 and 79, and its port 81, into the lower chamber 82 of the anvil-cylinder. Fluid under pressure also flows from the conduit 75 through the conduit 84 into the chamber 88 in the valve block 86, thence through the valve 91, pipe 92, and conduit 93 into the upper chamber 94 of the anvil-cylinder. Fluid under pressure also flows from the chamber 88 in the valve block through the passage 96, the exhaust valve 95, pipe 97, and conduit 98, into the upper chamber 94 of the hammer-cylinder.

The pressure of the fluid thus introduced into the upper chamber 94 of the anvil-cylinder balances the pressure of the fluid in the lower chamber 82 of the cylinder, so that the weight of the anvil, the piston and the piston rod depresses the anvil until it rests upon the base 1 of the machine. The drawings illustrate the various parts of the machine in full lines in this normal position.

When it is desired to drop the hammer, the operator presses the handle 149, (Figs. 1, 2, and 3), thereby admitting fluid under pressure to the valve-actuating cylinder 131, (Fig. 3), forcing the piston inwardly and causing the arm 135 upon the piston rod to engage the roller 127 upon the arm 126 of the valve-actuating block 118, thus rotating the valve rod 113 a quarter turn and positioning both the valves 42 and 91 in exhaust position, as illustrated in Fig. 9. When fluid under pressure is thus released from the hammer-cylinder, the hammer begins to drop. The positioning of the valve 91 to exhaust position, however, merely permits fluid under pressure from the upper chamber 94 of the hammer-cylinder to enter the horizontal passage 99 of the casing 85 where it is checked by the valve 95 which is then in the closed position illustrated in Fig. 9, with fluid under pressure still being supplied through it and the pipe 97 to the upper chamber 94 of the anvil-cylinder.

As the hammer descends, the pin 161 engages the spiral groove 160 in the sleeve 159 which is secured to the exhaust valve rod 158, thereupon rotating the exhaust valve 95 a quarter turn, thus causing the port in the exhaust valve to establish communication between the passage 99 and the exhaust pipe 100, as illustrated in Fig. 10, from which it flows into the exhaust passage 102. When the pressure is thus released from the upper chamber 94 of the anvil-cylinder, the full force of the fluid under pressure in the lower chamber 82 of the anvil-cylinder is exerted upon the piston 67 so that the anvil is projected upwardly with rapid acceleration toward the descending hammer.

As the descending hammer approaches closely to the plane or zone of impact of the hammer and anvil, the pin 155, (Fig. 1), engages the cam groove in the flange 154 of the sleeve 153 which is secured to the valve rod 113 which controls the main operating valve, thereby rotating the valves 42 and 91 simultaneously to normal position, as shown in Fig. 11, the valves 42 and 91 being then in the same position as illustrated in Fig. 8. The operating valves 42 and 91 are thus rotated to normal position just before the hammer meets the anvil, so that immediately at impact fluid will enter the hammer-cylinder and will continue to move the hammer upwardly from rebound. At the same time, fluid under pressure will be admitted to the upper chamber 94 of the anvil-cylinder and immediately after impact will build up pressure in the upper chamber 94 of the anvil-cylinder which will cause the descent of the anvil.

By thus introducing fluid under pressure into the hammer-cylinder and upper chamber of the anvil-cylinder immediately upon impact, all danger of a repeated or secondary blow is avoided. Furthermore, by thus introducing fluid under pressure immediately upon impact of the hammer and anvil, the fluid under pressure, acting upon the hammer, will cause it to continue its upward movement initially caused by rebound, thereby enabling the hammer to be raised more effectively and with less pressure than would be required if the hammer were raised from a position of rest.

By reason of the operation above described, the anvil is projected upwardly with such acceleration, produced by the powerful pressure of the fluid in the lower chamber 84 of the anvil-cylinder, that with the travel of, for example, approximately one inch it will acquire a momentum equal to that of the hammer dropping by gravity through a relatively greater distance of approximately fourteen inches. By thus controlling the reciprocation of the hammer and anvil, the force exerted by each at the moment of impact will be absorbed by the other, thus preventing transmission of vibration to the frame of the machine.

Inasmuch as the hammer is continuously subject to the action of gravity and the anvil is continuously subject to the full pressure of the fluid acting upon the under surface of the piston 67 in the anvil-cylinder, the reciprocable hammer and reciprocable anvil are subject respectively to forces continuously tending to propel them toward each other. The raising of the hammer against the force of gravity and the depression of the anvil against the force of the fluid tending to project it upwardly are both accomplished by the fluid under pressure admitted through the operating valves 42 and 91 respectively to the hammer-cylinder and to the upper chamber of the anvil-cylinder. Consequently, the fluid under pressure thus introduced moves the hammer and anvil respectively against the resistance of the respective forces acting upon the hammer and anvil such distance and with such force that upon release of the fluid under pressure the hammer and anvil will be caused to meet within a predetermined zone with substantially equal momentum upon release of the fluid under pressure from the hammer-cylinder and the upper chamber 94 of the anvil-cylinder.

Suitable means of adjustment of the cam sleeves 153 and 159 are provided for enabling the valves 91 and 95 so to be adjusted as to cause the hammer and anvil to meet in a predetermined plane or narrow zone.

Where no variation in the distance of relative movement between the hammer and anvil is required, it is found in practice that equal vertical adjustments of the cam sleeves 153 and 159 will properly coordinate the operating and exhaust valves, means have, therefore, been provided for simultaneously equally adjusting both of these sleeves.

In the construction illustrated in Fig. 1, a collar 162 is adjustably secured by suitable set screws 163 or otherwise upon a vertical shaft or rod 164, the upper end of which is secured by a suitable clamping member 165 upon the bracket 110 which is mounted upon the end of the cylinder-supporting beam, while the other end of the rod 164 is seated in a boss 166 in covering 121 of the box which contains the valve operating mechanism.

The collar 163 is provided with arms 167 and 168 which rotatably engage respectively the sleeves 153 and 159 in such manner that these sleeves and the cams carried thereby may be properly positioned by a vertical adjustment of the collar 162 and maintained in adjusted position by setting up the screws 163.

Where it is desired to permit adjustment of the cam sleeves 153 and 159 to enable the hammer to be raised to different heights and thereby to permit the hammer to be operated with different lengths of stroke, means may be provided for adjustably securing the cam sleeves 153 and 159 to their respective rods and a suitable indexing device employed to enable the cam sleeves to be set in such position as to produce the proper co-ordination between the operations of the operating and exhaust valves.

Means for accomplishing this purpose is illustrated in Fig. 16 (page 1 of the drawings). In this construction the cam sleeve 153, having the spiral cam 154, is adjustably secured to the rod 113 by set screws. A positioning collar 162× which is adjustably secured by set screws 163 to the rod 164, is provided with an extension adapted to engage the upper end of the cam sleeve 153. This extension is provided with an upwardly extending, graduated bar or scale, by means of which the proper setting of the upper cam spiral may be readily determined in the following manner. Another positioning collar 169× is adjustably secured to the rod 164 by set screws and is provided with an extension adapted to engage the lower end of the cam sleeve 159, which is provided with the upper spiral cam.

When it is desired to adjust the cam sleeves 153 and 159 properly to correlate the operating and exhaust valves when dies of different heights are employed, or to provide a different stroke of the hammer, fluid under pressure is gradually let out of the exhaust valves to bring the dies of the hammer and anvil into engagement. The lower spiral cam 153 is thereupon adjusted upon the rod 113 until a suitable scratch or other index upon it is in registry with the lower cam actuating pin 155 upon the hammer, and is then clamped upon the rod by its set screws. The positioning collar 162× is then adjusted until its lower face rests upon the upper end of the spiral cam 153. The collar 56 upon the piston rod which supports the hammer is adjusted vertically upon the piston rod until the distance between its upper end and the lower end of the boss 25 on the cylinder supporting beam correspond to the desired length of drop of the hammer. The collar 169× is then so adjusted that an index carried thereby will be opposite a graduation upon the scale 167× corresponding to the desired distance of drop of the hammer and the collar 169 then clamped upon the rod by its set screws. The sleeve 159 is then adjusted so as to cause its lower end to rest upon the extension of the collar 169×. If the stroke only is to be changed, it is not necessary to move or change the position of the lower spiral.

A further feature of the invention consists in providing means for controlling the rate of speed of movement of the hammer and anvil. If, during the operation of the machine it is found that the anvil is being depressed too rapidly, it may be retarded by adjusting the throttling screw 84, Fig. 2, which controls the cross sectional area of the passage 83 through which fluid under pressure is delivered to the upper chamber 94 of the anvil cylinder. If the hammer rises too rapidly its movement may be retarded by adjusting the throttling screw 43 which controls the effective cross sectional area of the conduit 37 in the valve block 35 through which fluid under pressure is admitted to the hammer cylinder.

Desirably means are provided for controlling the speed at which the hammer is dropped and complementary means also are provided for controlling the acceleration of the anvil. In the construction illustrated herein the speed at which the hammer is dropped is controlled through the valve 47 in the casing 46, the valve 47 having an angular or converging curvilinear port therethrough adapted when rotarily adjusted to determine the effective cross sectional area of the exhaust passage 45. The exhaust valve 47 is provided with a stem 169 having an angular end portion which engages a complementary socket 170 in the upper end of an exhaust control rod 171, the lower end of which is seated in a socket in the cover plate 121 for the box 122 which contains the valve-actuating mechanism. The rod 171 has secured to its lower end a sleeve 172 which is provided with a laterally extending handle 173 which may be operated to rotate the valve 47 to the desired position of adjustment. A suitable scale 167× may be located in proximity to the handle 173 or an index operable thereby (not shown) to locate readily the setting of the handle to produce a blow of a desired force. By reason of this arrangement the force of the blow can be accurately gauged.

Any suitable means may be provided for coordinating the cross sectional area of the exhaust passage 102 from the upper chamber 94 of the anvil-cylinder with the effective cross sectional area of the exhaust passage 45. In the preferred construction illustrated, (Figs. 3 and 12), a tapered valve casing 174 is seated in a complementary bore extending downwardly from the top of the bed 1 of the machine through the boss 103, which contains the exhaust passage 102. The valve casing 174 is provided with a preferably annular flange 175 which is secured by suitable machine screws to the base 1.

The valve casing 174 has a cylindrical bore in which a piston 176 is reciprocably mounted. The lower portion of the piston desirably is provided with a plurality of piston rings 177. The length of the piston proper is somewhat greater than the diameter of the exhaust passage 102 and is provided with an upward extension 178 of reduced diameter having at its upper end a head 179 which slidably fits the cylinder. A spring 180 is interposed between the upper end of the piston head and a block 181, which is engaged by an adjusting screw 182 mounted in the head 183 of the valve casing which desirably is adjustably screwed into the upper end of the valve casing 174.

The valve casing is provided with a port communicating with the passage 102 of such character that proper adjustment of the piston 176 transversely of the passage will provide the required cross sectional area to permit proper escape of fluid under pressure from the upper chamber 94 of the anvil-cylinder in correlation to the escape of fluid under pressure from the hammer-cylinder.

In the preferred construction illustrated the valve casing 174 is provided with a rectangular countersink 184 extending approximately halfway through the wall of the casing, while the remainder of the casing is cut away to produce an aperture 185 having curved upwardly converging walls 186 and 187 which nearly meet at their upper ends, but are widely separated at their lower ends.

The lower end of the valve casing 174 is closed by a preferably integral head 188 having a stop screw 189 extending therethrough adapted to determine the lower limit of the movement of the piston. In order to co-ordinate the operation of the piston valve 186, which controls the exhaust for fluid under pressure from the upper chamber 94 of the anvil-cylinder with the exhaust from the hammer-cylinder, fluid under pressure is conducted from the conduit 34, (Fig. 6), which leads to the hammer-cylinder, through a pipe 190 to the chamber 191 beneath the piston 176.

When, therefore, fluid under pressure is introduced through the conduit 34 into the hammer-cylinder, to raise the hammer and to sustain it in raised position, the fluid under pressure will also pass through the pipe 190 into the chamber 191 of the casing which controls the regulating valve 176 for the exhaust from the chamber 94 of the anvil-cylinder, thus raising the piston valve 176 and closing the exhaust passage 102.

Upon release of the fluid under pressure from the hammer-cylinder by rotation of the valve 42 to exhaust position, as heretofore described, the pressure of the fluid in the hammer-cylinder and the conduit 34 will be reduced, correspondingly reducing the pressure in the chamber 191 of the casing 174, thereby permitting the piston valve 176 gradually to be forced downwardly by the spring 180, thus progressively uncovering the downwardly diverging aperture 185 in said casing and permitting the fluid under pressure to escape at a rate correlated to the escape of fluid under pressure from the hammer-cylinder.

It will be remembered that the exhaust-controlling valve 47 for the hammer-cylinder may be adjusted by a hand lever 173 to control the rapidity of the descent of the hammer. When the exhaust from the hammer-cylinder is thus restricted, the fluid under pressure in the hammer-cylinder 24 and the conduit 34 is maintained at a higher pressure than if the valve 47 were rotated to wide open position. Consequently, the pressure of the fluid transmitted through the pipe 190 to the chamber 191 of the valve casing is maintained at a higher pressure and the descent of the piston 176 is correspondingly resisted, so that the piston valve 176 will be properly positioned in correlation to that of the valve 46 to cause the anvil to move upwardly at an acceleration and with a force proportional to the controlled dropping movement of the hammer such that the hammer and anvil may be caused to meet in the plane or zone of impact with substantially the same momentum irrespective of the rate at which the hammer is permitted to descend. Thus means are provided for releasing fluid under pressure from the hammer-cylinder and the upper chamber 94 of the anvil-cylinder which will cause the hammer and anvil to meet in a predetermined zone with substantially equal momentum.

While the mechanism for actuating the anvil member of a power hammer or press has thus far been particularly described in respect to its employment in a drop hammer construction, it will be obvious that the same mechanism or the principles embodied therein may be employed in other types of hammers comprising cooperating relatively movable power-applying members having fluid operated means acting upon one of the members at a substantially constant high pressure tending to force it toward the other member with means for counterbalancing the force of said constant pressure operable to separate the relatively movable members and means for controlling the counterbalancing means selectively operable to permit said constant pressure to propel the member actuated thereby toward the other member gradually or rapidly with substantially the full force of said constant pressure.

In other words, the present invention comprises actuating means such as a cylinder having a piston reciprocable therein for actuating one of the relatively movable members of a power hammer in which fluid under pressure is introduced into one of the chambers of the cylinder at constant high pressure, thereby tending to force the member actuated thereby toward the other member, with counterbalancing means, such as means for introducing fluid under pressure into a chamber of the cylinder upon the opposite side of the piston, at such pressure as will in conjunction with the weights of the parts propelled by the fluid under constant high pressure retract the member against said constant force.

Selectively operable means are provided for relieving the counterbalancing pressure either suddenly to produce a rapid blow, or gradually through any predetermined distance to provide a relatively slow movement of the actuating member and upon full release at the end of such gradual movement to permit the full high pressure to act upon the member during the remainder of its movement.

Obviously the same principle may be employed if the area which is subjected to the counterbalancing pressure is greater than the area to which the constant high pressure is subjected and the chambers upon both sides of the piston subjected to the same degree of pressure. By controlling the exhaust of fluid under pressure from the chamber of the piston through which the counterbalancing pressure is effected the invention may be readily applied to power presses in which it is desirable to cause a slow movement of the relatively movable members until the die faces thereof are brought into contact with the material to be shaped and the material then subjected to the full pressure which actuates the movable member.

In usual drop hammer constructions considerable difficulty has been encountered in providing means for securing the piston rod, which raises the hammer, to the piston of the hammer-cylinder, so that it will not become loosened by the vibration caused by the impact of the hammer and anvil. A novel construction, which will avoid any loosening or detachment of the piston from the piston rod, is illustrated in Figs. 6 and 15. In this construction the upper end of the piston rod 22 is provided with a tapered section 192 having at its lower end a shoulder 193 and near its upper end a screw threaded section 194 and above that a section of smaller diameter having a series of integral horizontal flanges or ribs 195. The piston comprises a lower plate 196, having a peripheral recess extending downwardly from the upper face thereof adapted to receive a leather, or other fibre, packing 197 which extends over the periphery of the plate 196, and an upper section 198 preferably in the form of a downwardly and outwardly tapering sleeve having a flat face which engages the upper face of the packing 197. The upper end of the sleeve 198 is engaged by a nut 199 upon the screw threaded section 194 of the piston rod which when set up tightly clamps the sleeve against the packing 197, thus securely holding it in place.

The nut 199 desirably is of angular contour and is held in place by a lock comprising complementary semi-cylindrical sections 200 and 201 having internal grooves complementary to the ribs 195 and provided with complementary flanges adapted to be secured together by screws or bolts 202, (Figs. 6 and 15).

By reason of this construction movement of the nut 199 lengthwise of the piston rod is absolutely prevented. Consequently, any danger of looseness of the piston upon the piston rod is avoided.

While in the illustrative embodiment of the invention herein disclosed, hand-operated means, in the form of a manually-operable valve actuated by a handle 149, are provided for controlling the operating valves, it will be readily understood that pedal-actuated mechanism or automatically-actuated mechanism, such as that disclosed in the aforesaid Patent No. 1,924,545, may be employed, and also that suitable safety devices, such as those disclosed in said application, may also be incorporated in machines embodying the present invention.

It will be underlstood that the particular embodiment of the invention disclosed herein is of an illustrative character and is not restrictive of the meaning and scope of the following claims.

Having thus described the invention, what is claimed as new, and desired to be secured by Letters Patent, is:

1. A drop hammer construction comprising a reciprocable hammer, a reciprocable anvil, a cylinder having a piston connected to said hammer, a cylinder having a piston connected to said anvil, a source of fluid under pressure, means for continuously supplying fluid under pressure from said source to the chamber of the anvil-cylinder beneath its piston, conduits leading from said source respectively to the chamber of the anvil-cylinder above said piston and to the hammer-cylinder below its piston, exhaust passages communicating with the respective conduits, operating valves in said conduits, means operable by the dropping of the hammer to position said valves simultaneously to admit fluid under pressure to the hammer-cylinder and to the chamber of the anvil-cylinder above its piston, and manually-controlled means for moving said valves to exhaust position.

2. A drop hammer construction comprising a reciprocable hammer, a reciprocable anvil, a cylinder having a piston connected to said hammer, a cylinder having a piston connected to said anvil, a source of fluid under pressure, means for continuously supplying fluid under pressure from said source to the chamber of the anvil-cylinder beneath its piston, conduits leading from said source respectively to the chamber of the anvil-cylinder above said piston and to the hammer-cylinder below its piston, exhaust passage communicating with the respective conduits, operating valves in said conduits, means operable by the dropping of the hammer to position said valves simultaneously to admit fluid under pressure to the hammer-cylinder and to the chamber of the anvil-cylinder above its piston, manually-controlled means for moving said valves to exhaust position, an exhaust controlling valve in the exhaust passage of the anvil-cylinder, and means operable by the hammer during its initial dropping movement to move said valve from closed to exhaust position and upon upward movement of the hammer to restore said valve to closed position.

3. A drop hammer construction comprising a reciprocable hammer, a reciprocable anvil, a cylinder having a piston connected to said hammer, a cylinder having a piston connected to said anvil, a source of fluid under pressure, means for continuously supplying fluid under pressure from said source to the chamber of the anvil-cylinder beneath its piston, conduits leading from said source respectively to the chamber of the anvil-cylinder above said piston and to the hammer-cylinder below its piston, exhaust passages communicating with the respective conduits, operating valves in said conduits, means operable by the dropping of the hammer to position said valves simultaneously to admit fluid under pressure to the hammer-cylinder and to the chamber of the anvil-cylinder above its piston, manually-controlled means for moving said valves to exhaust position, co-operating throttle valves in said conduits operable conjointly to restrict the exhaust from said hammer-cylinder and said anvil-cylinder and thereby to control the effective blow of impact.

4. A drop hammer construction comprising a reciprocable hammer, a reciprocable anvil, a cylinder having a piston connected to said hammer, a cylinder having a piston connected to said anvil, a source of fluid under pressure, means for continuously supplying fluid under pressure from said source to the chamber of the anvil-cylinder beneath its piston, conduits leading from said source respectively to the chamber of the anvil-cylinder above said piston and to the hammer-cylinder below its piston, exhaust passages communicating with the respective conduits, operating valves in said conduits, means operable by the dropping of the hammer to position said valves simultaneously to admit fluid under pressure to the hammer-cylinder and to the chamber of the anvil-cylinder above its piston, manually-controlled means for moving said valves to exhaust position, a throttle valve in the exhaust passage of said hammer-cylinder conduit, means for adjusting the same, a throttle valve in the exhaust passage of the anvil-cylinder conduit, and means operable by variations in pressure in the hammer-cylinder conduit to position the latter and to correlate the rate of exhaust from the anvil-cylinder to that from the hammer-cylinder.

5. A drop hammer construction comprising a reciprocable hammer, a reciprocable anvil, a cylinder having a piston connected to said hammer, a cylinder having a piston connected to said anvil, a source of fluid under pressure, means for continuously supplying fluid under pressure from said source to the chamber of the anvil-cylinder beneath its piston, conduits leading from said source respectively to the chamber of the anvil-cylinder above said piston and to the hammer-cylinder below its piston, exhaust passages communicating with the respective conduits, operating valves in said conduits, means operable by the dropping of the hammer to position said valves simultaneously to admit fluid under pressure to the hammer-cylinder and to the chamber of the anvil-cylinder above its piston, manually-controlled means for moving said valves to exhaust position, a throttle valve in the exhaust passage of the hammer-cylinder, means for adjusting the same, a fluid-actuated throttle valve in the exhaust passage of the anvil-cylinder, and means for conducting fluid under pressure from the cylinder-conduit to the fluid-actuated throttle valve operable to cause the latter to correlate the rate of exhaust from the anvil-cylinder to that from the hammer-cylinder.

6. A drop hammer construction comprising a hammer, power means to lift the hammer, an anvil, separate power means to propel said anvil toward said hammer, a hammer control means operable to release said hammer from said power means to allow the hammer to drop, and an anvil control means automatically operable in correlation with the hammer control means to cause said propelling means to impart to the anvil an upward movement which will counteract the downward movement of the hammer at the moment of impact.

7. A drop hammer construction comprising a hammer, power means to lift the hammer, an anvil, a separate means operable by fluid under pressure to propel the anvil toward the hammer, a hammer control means operable to release said hammer from said power means to allow the hammer to drop, an anvil control means for said fluid pressure actuating means automatically operable in correlation to said hammer control means to cause said fluid pressure actuating means to impart to the anvil an upward movement which will counteract the downward movement of the hammer at the moment of impact.

8. A drop hammer construction comprising a hammer, power means to lift the hammer, an anvil, a separate means operable by fluid under pressure to propel the anvil toward the hammer, a hammer control means operable to release said hammer from said power means to allow the hammer to drop, an anvil control means for said fluid pressure actuating means operable by the hammer during its dropping movement to cause said fluid pressure actuated means to propel the anvil toward the hammer with sufficient force to impart to the anvil a momentum equal to that of the dropping hammer at the moment of impact.

9. A drop hammer construction comprising a hammer, power means to lift the hammer, an anvil, a separate means operable by fluid under pressure to propel the anvil toward the hammer, a hammer control means operable to release said hammer from said power means to allow the hammer to drop, an anvil control means for said fluid pressure actuating means operable by the hammer during its dropping movement to cause said fluid pressure actuated means to propel the anvil toward the hammer with sufficient force to impart to the anvil a momentum equal to that of the dropping hammer at the moment of impact, and means for adjusting said anvil control means to cause the fluid pressure actuating means to propel said anvil toward said hammer with sufficient force to impart to the anvil, while traveling a short distance, a momentum equal to the momentum acquired by the hammer while dropping a relatively great distance.

10. A drop hammer construction comprising a hammer, power means to lift the hammer, an anvil, separate means for applying to said anvil a constant force of fluid under pressure tending to propel said anvil upwardly toward said hammer, separate means for counterbalancing said constant force operable to maintain said anvil in depressed position, a hammer control means operable to release said hammer from said power means to allow the hammer to drop, an anvil control means automatically operable in correlation with said hammer control means to release said counterbalancing means and thereby permit said constant force of fluid pressure to impart to said anvil a momentum equal to that of the dropping hammer at the moment of impact.

11. A drop hammer construction comprising a hammer, power means to lift the hammer, an anvil, separate means for applying to said anvil a constant force of fluid pressure sufficient to impart to said anvil, while traveling a short distance, a momentum equal to that acquired by the hammer while dropping a relatively greater distance, separate means operable by fluid under pressure to counterbalance said constant force and maintain said anvil in depressed position, a hammer control means operable to release said hammer from said power means at a predetermined height, an anvil control means automatically operable in correlation with said hammer control means to release said counterbalancing fluid under pressure after the hammer has dropped such predetermined distance as will permit said constant force of fluid pressure to propel the anvil toward the hammer with such force as to cause the hammer and anvil to meet within a predetermined narrow zone with equal momentum.

12. A drop hammer construction comprising a hammer, means operable by fluid under pressure to lift the hammer, an anvil, means for applying to said anvil a constant force of fluid pressure sufficient to impart to said anvil, while traveling a short distance, a momentum equal to that acquired by the hammer while dropping a relatively greater distance, means operable by fluid under pressure to counterbalance said constant force, and to maintain said anvil in depressed position, a valve operable to release fluid under pressure from said hammer-lifting means, a valve operable to release the fluid under pressure from said counterbalancing means automatically operable in correlation with the operation of the valve for releasing fluid pressure from said hammer-lifting means to release said counterbalancing fluid under pressure, thereby permitting said constant force of fluid pressure to propel the anvil toward the hammer with such force as to cause the hammer and anvil to meet within a predetermined narrow zone with equal momentum.

13. A drop hammer construction comprising a hammer, means operable by fluid under pressure to lift said hammer, an anvil, means for applying to said anvil a constant force of fluid pressure sufficient to impart to said anvil, while traveling a short distance, a momentum equal to that acquired by the hammer while dropping a relatively great distance, means operable by fluid under pressure to counterbalance said constant force and to maintain said anvil in depressed position, a hammer control means operable to release the fluid under pressure acting upon said hammer to allow the hammer to drop, an anvil control means operable to release said counterbalancing fluid under pressure, and manually controlled means operable by fluid under pressure for conjointly actuating said hammer control means and said anvil control means in such correlation as to cause said constant force of fluid under pressure to propel the anvil toward the hammer with such force as to cause the hammer and anvil to meet within a predetermined narrow zone with equal momentum.

14. A drop hammer construction comprising a hammer, power means to lift the hammer, an anvil, a separate means operable by fluid under pressure to propel the anvil toward the hammer, a hammer control means operable to release said hammer from said power means to allow the hammer to drop, an anvil control means for said fluid pressure actuating means operable by the hammer during its dropping movement to cause said fluid pressure actuated means to propel the anvil toward the hammer, means for regulating the height to which the hammer is raised, and means for correlating the actuation of said anvil control means to the distance through which the hammer is dropped to cause said fluid pressure actuated means to propel the anvil toward the hammer with sufficient force to impart to the anvil a momentum equal to that of the dropping hammer at the moment of impact.

15. A drop hammer construction comprising a hammer, means operable by fluid under pressure to lift the hammer, an anvil, means for applying to said anvil a constant force of fluid pressure sufficient to impart to said anvil, while traveling a short distance, a momentum equal to that acquired by the hammer while dropping a relatively greater distance, means operable by fluid under pressure to counterbalance said constant force and maintain the anvil in depressed position, a hammer control means operable to release said hammer from said power means at a predetermined height, an anvil control means automatically operable in correlation with said hammer control means to release said counterbalancing fluid under pressure when the hammer is dropped a predetermined distance, and means for conjointly regulating the rate at which fluid under pressure is released respectively from said hammer lifting means and said counterbalancing means to vary the force of the blow produced by the impact of the hammer and anvil.

16. A drop hammer construction comprising a hammer, a hammer cylinder having a piston connected to said hammer, means for supplying fluid under pressure to said cylinder to lift the hammer, an anvil, means for applying to said anvil a constant force of fluid pressure sufficient to impart to said anvil, while traveling a short distance, a momentum equal to that acquired by the hammer while dropping a relatively greater distance, separate means operable by fluid under pressure to counterbalance said constant force and maintain the hammer in depressed position, a hammer control means operable to release the fluid under pressure from said cylinder when said hammer is raised to a predetermined height, an anvil control means automatically operable in correlation with said hammer control means to release said counterbalancing fluid under pressure when the hammer is dropped a predetermined distance, manually operable means for regulating the rate of release of fluid under pressure from said hammer cylinder, and fluid pressure actuated means automatically controlled by variations of fluid pressure in said hammer cylinder operable to regulate the rate of release of said counterbalancing fluid under pressure in correlation to the rate of release of fluid under pressure from said hammer-lifting means to cause the hammer and anvil to meet with substantially equal predetermined momentum within a predetermined narrow zone.

17. A drop hammer construction comprising a base frame, columns extending vertically upward therefrom, an anvil, and a hammer, each having widely spaced pairs of bearings reciprocably mounted upon said columns, counterbores in each of said bearings extending inwardly from the remote ends of said bearings nearly through said bearings, bushings of relatively softer metal in said counterbores adapted to be gradually condensed by the repeated impacts of the hammer and anvil thereby to maintain a perfect sliding fit of the bearings upon said columns, and to maintain accurate alinement of the paths of movement of the centers of mass of the hammer and anvil, power means to lift said hammer, separate power means to propel said anvil toward said hammer, a hammer control means operable to release said hammer from said power means to allow the hammer to drop, and an anvil control means automatically operable in correlation with the hammer control means to cause said propelling means to impart to the anvil an upward movement which will counteract the downward movement of the hammer at the moment of impact and cause the forces exerted by the hammer and anvil each to be absorbed by the other without transmission of vibration to said frame.

REGINALD P. FITZGERALD.